United States Patent [19]

Otake

[11] 3,737,150
[45] June 5, 1973

[54] SCREW EXTRUDER

[76] Inventor: Naoji Otake, No. 11-17, 7-chome, Shibamata, Katsushika-ku, Tokyo, Japan

[22] Filed: Jan. 11, 1972

[21] Appl. No.: 216,932

[30] Foreign Application Priority Data

Feb. 4, 1971   Japan..................................46/4005

[52] U.S. Cl..............................................259/191
[51] Int. Cl...............................................B01f 7/08
[58] Field of Search.........................259/191, 192, 9, 259/10; 425/203

[56] References Cited

UNITED STATES PATENTS 2,736,058   2/1956   Dellheim............................425/203
3,035,304   5/1962   Reifenhauser.......................259/191
3,350,742   11/1965  Wood..................................259/191

*Primary Examiner*—Robert W. Jenkins
*Attorney*—Joseph M. Fitzpatrick, John Thomas Cella and Charles B. Cannon et al.

[57] ABSTRACT

In a screw extruder of the type including a cylinder and a rotary screw contained in the cylinder and adapted to extrude molten material, a notch is provided for the helical vane of the screw, a vent tube is provided to extend through the wall of the cylinder at a portion corresponding to the notch, the inner end of the vent tube is terminated closely adjacent to the peripheral surface of the shaft of the screw and a second notch is formed on the inner end of the vent tube in the direction of extrusion of the molten material.

4 Claims, 5 Drawing Figures

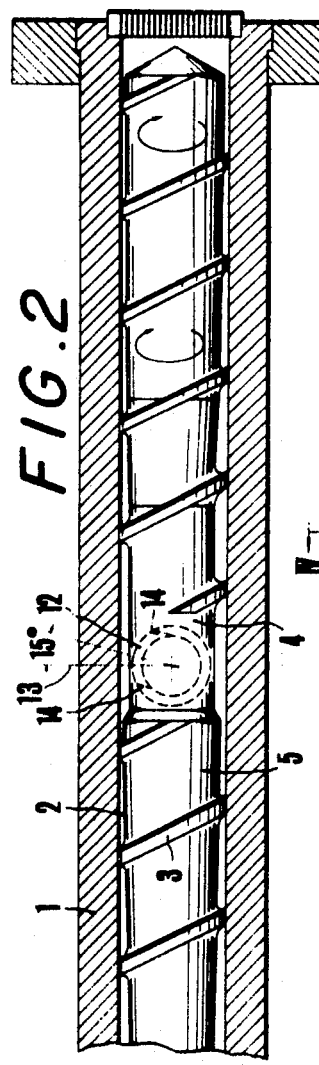
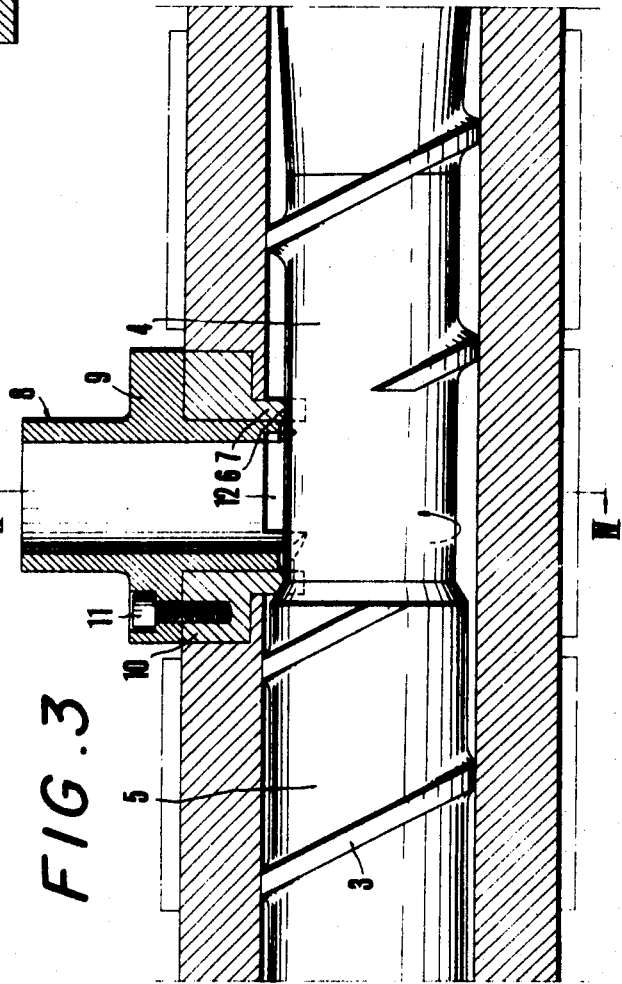

PATENTED JUN 5 1973 3,737,150

SCREW EXTRUDER

BACKGROUND OF THE INVENTION

This invention relates to a screw extruder for kneading and extruding plastic materials, rubber or the like and more particularly to a screw extruder provided with an improved vent for venting gases liberated from the synthetic resins or rubber in the molten state while they are kneaded.

Screw extruders having a vent opening for removing the gas liberated from the molten material during kneading are well known in the art. However, vent opening at a portion of a cylinder containing a screw has a tendency to leak the molten material through the vent opening. To overcome this difficulty, it has been proposed to use a screw of a special cnstruction or to install vanes driven by an electric motor in the vent opening for pushing back the molten material. However, such prior approaches are not advantageous in that they are difficult to machine or complicated in construction.

SUMMARY OF THE INVENTION

Accordingly, it is an object of this invention to provide an improved gas vent of simple construction for a screw extruder capable of venting the gas liberated from the molten material extruded by the extruder without leaking the molten material.

According to this invention, there is provided a screw extruder of the type including a cylinder and a rotary screen contained in the cylinder and adapted to extrude molten material, characterized in that a notch is provided for the helical vane of the screw, that a vent tube is provided to extend through the wall of the cylinder at a portion corresponding to the notch, that the inner end of the vent tube is terminated closely adjacent to the peripheral surface of the sahft of the screw and that a second notch is formed on the inner end of the vent tube in the direction of extrusion of the molten material.

DESCRIPTION OF THE DRAWINGS

In the accompanying drawings:

FIG. 2 shows a longitudinal section of the cylinder;

FIG. 3 shows an enlarged longitudinal section of a portion of the cylinder and the gas vent tube;

DESCRIPTION OF THE PREFERRED EMBODIMENT

Figure 1:
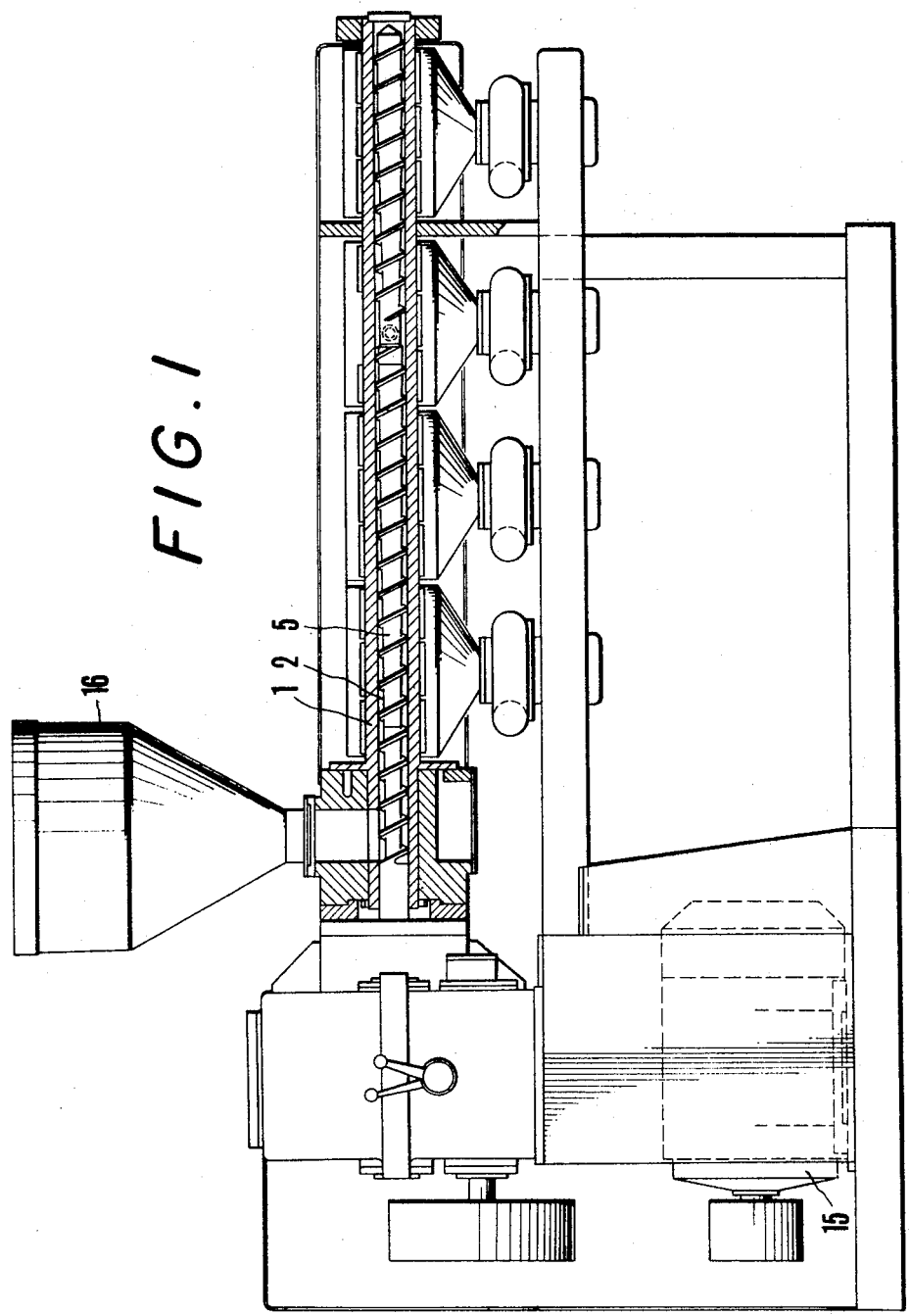
FIG. 1 shows a side elevation, partly in section, of a screw extruder embodying the invention.

A screw extruder shown in FIG. 1 comprises a horizontal cylinder 1, a screw contained in the cylinder and driven by an electric motor 15 and a hopper 16 mounted on the entrance end of the cylinder 1 for feeding raw materials into the cylinder. The cylinder 1 is provided with a heater, such as an electric heater not shown, for heating and melting the raw materials, thus kneading and extruding the molten material. A notch 4 is formed at a portion of the helical vane 3 of the screw. The diameters of the notch 4 and the portion of shaft 5 slightly ahead of notch 4 are slightly reduced to provide a larger gap between these portions and the inner wall of cylinder 1 than at another portions. An opening 6 is formed through the upper wall of cylinder 1 at a portion confronting notch 4. A bushing 7 is fitted in opening 6 to receive a gas vent tube 8 to be slidable in the vertical direction when urged by the material to be extruded. A flange 9 on the outer periphery of vent tube 8 is secured to the head 10 of flange 10 by bolts 11. The vent tube 8 extends through the wall of the cylinder 1 with its inner end closely adjacent the reduced diameter portion of the screw shaft 5 with a gap varying from 0 to 5 mm. However, it is advantageous to maintain the gap at a value of about 1 mm as the vent tube 8 is adjusted in the vertical direction. A notch 12 is formed on the inner fore edge of the vent tube. As best shown in FIG. 2, notch 12 is defined by side edges 14 at an angle of about 15° with respect to a line 13 perpendicular to the axis of screw 2 and the spacing between side edges 14 of the notch is approximately equal to the inner diameter of vent tube 8.

Figure 4:
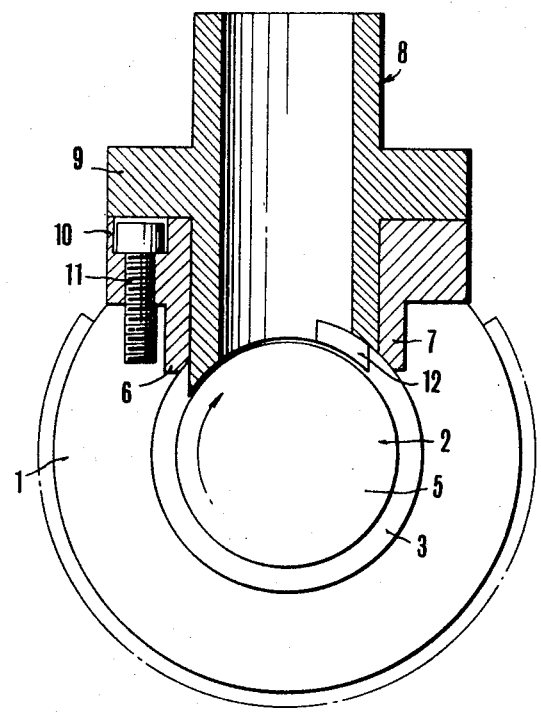
FIG. 4 shows a sectional view taken along a line IV — IV in FIG. 3.
Figure 5:
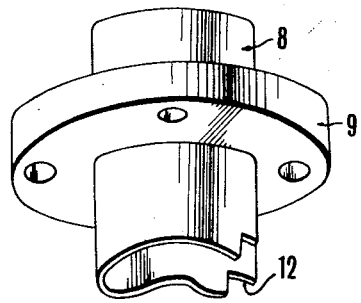
FIG. 5 shows a perspective view of the gas vent tube.

In operation, when the molten material is advanced to the reduced diameter portion of screw shaft 5 by the rotation of screw 2 the molten material is allowed to expand slightly so as to expell outwardly the gas contained in the molten material through notch 12 and vent pipe 8. Screw 12 is rotated in the direction of arrows shown in FIGS. 2 to 4 to helically advance the molten material by the inclination of screw vane 3. Since the inner end of the vent tube 8 is nearly in contact with the outer periphery of the screw shaft 5 at a point to the rear of the direction of extrusion the molten material is positively prevented from leaking into the vent tube 8. Further, as the notch 12 is positioned at a point ahead of the direction of extrusion, the material in this position will not be subjected to the extrusion pressure. For this reason, there is no fear of leaking the molten material into the vent tube through notch 12. Thus, it is possible to vent gas through a vent tube of simple construction without leaking the molten material.

The purpose of bushing 7 is to reinforce the vent tube 8 and facilitate the mounting thereof so that the bushing may be omitted. Also the position of the notch 12 is not limited to the illustrated position but may be varied between line 13 which is normal to the axis of the screw and this axis extending in the direction of extrusion. However, the illustrated position is desirable for the ordinary inclination of the screw vane. Further, it will be clear that a plurality of vent tubes may be provided along the screw.

Although the invention has been shown and described in terms of a preferred embodiment thereof it will be clear that many changes and modifications may be made without departing from the true spirit and scope of the invention as defined in the appended claims.

What is claimed is:

1. In a screw extruder including a cylinder and a rotary screw contained in the cylinder and adapted to extrude molten material, the improvement which comprises a helical vane of said screw, said vane being notched at a portion thereof, and a vent tube extending through the wall of said cylinder at a portion corresponding to said notch of said vane, the inner end of said vent tube being terminated closely adjacent to the peripheral surface of the shaft of said screw and provided with a second notch in the direction of extrusion of said molten material.

2. The screw extruder as claimed in claim 1, wherein the direction of said second notch ranges from a line perpendicular to the axis of said screw shaft to said axis extending in the direction of extrusion of said molten material.

3. The screw extruder as claimed in claim 2, wherein said second notch is positioned at an angle of approximately 15° with respect to said line perpendicular to said axis.

4. The screw extruder as claimed in claim 1, wherein the diameter of said screw shaft is slightly reduced at portions facing the inner end of said vent tube.

* * * * *